J. B. JOHNSON.
TRIPODS FOR ROCK-DRILLS.

No. 186,842. Patented Jan. 30, 1877.

Witnesses:
Henry Chadbourn.
John A. Dougherty.

Inventor:
James Brown Johnson
by
Alban Andrén
his atty.

UNITED STATES PATENT OFFICE.

JAMES B. JOHNSON, OF BOSTON, MASSACHUSETTS, ASSIGNOR OF ONE-HALF HIS RIGHT TO EDWARD G. HIGHT AND EDWARD F. LITTLEFIELD, OF SAME PLACE.

IMPROVEMENT IN TRIPODS FOR ROCK-DRILLS.

Specification forming part of Letters Patent No. 186,842, dated January 30, 1877; application filed July 24, 1876.

*To all whom it may concern:*

Be it known that I, JAMES BROWN JOHNSON, of Boston, in the county of Suffolk and State of Massachusetts, have invented certain new and useful Improvements in Adjustable Tripods for Rock-Drills; and I do hereby declare that the following is a full, clear, and exact description thereof, which will enable others skilled in the art to which it appertains to make and use the same, reference being had to the accompanying drawings, and to letters of reference marked thereon, which form a part of this specification.

My invention relates to improvements in tripods and clamps for rock-drills, by which the rock-drill cylinder can be adjusted and secured in any desirable position; and my invention consists of a clamp surrounding the body of the rock-drill cylinder, and provided with two projecting ears, through which a bolt or hinge-pin is inserted, passing through the upper end of one or more of the legs that constitute the tripod, which upper end is provided with cogs or teeth fitting into a pinion that is adjustable as to position between the ears of the clamp, by means of a set-screw that passes through the pinion and the clamp-ears, and is secured by a nut on the outside of the clamp. The adjustable pinion is made tapering in one of its outer ends, that fits in a corresponding taper in the ear of the clamp. The hinge-pin, passing through the upper end of the legs of the tripod, is also provided with a nut on the outside of the ear of the clamp, by which the tripod is still more firmly secured in place after being properly adjusted. If one leg is to be attached to the clamp only I use only one pinion; but if two legs are to be secured to one and the same clamp, I employ two independent pinions, loosely movable around the same bolt, so that each leg can be adjusted independent of the other in the same clamp. Each leg in the tripod is made hollow, to receive the lower end or ground point, which is secured and adjusted to the upper part of the leg by means of a nut having a tapering recess in its interior, and provided with a flange, on which the weights are supported for holding the rock-drill firmly in its proper place. The lower end of the hollow leg is made split and tapering, to fit the tapering recess in the flanged nut, by which arrangement the hollow leg is compressed firmly around the cylindrical central ground point, when the flanged nut is screwed up tightly around the tapering screw-threaded end of the split leg.

Figure 3:
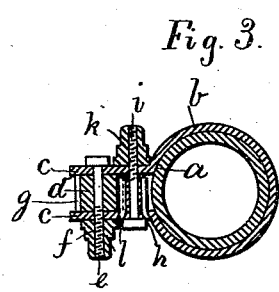
Figure 2:
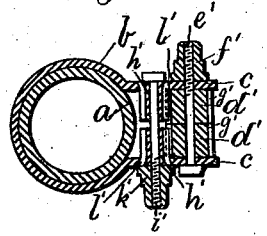
Figure 1:
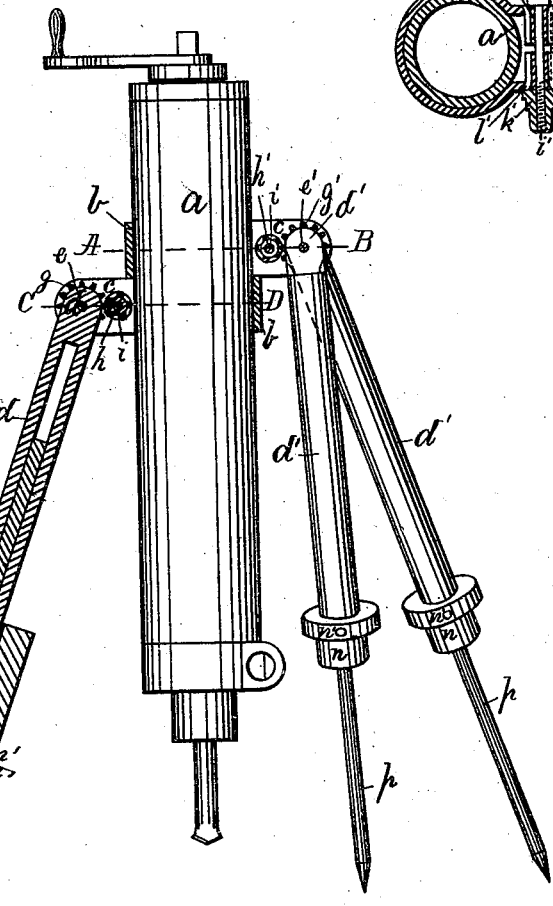
Figure 4:
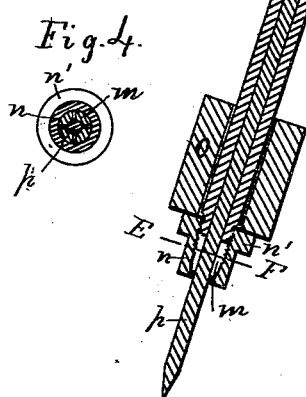

On the accompanying drawings, Figure 1 represents a sectional elevation of my invention. Fig. 2 represents a cross-section on the line A B, shown in Fig. 1. Fig. 3 represents a cross-section on the line C D, also shown in Fig. 1; and Fig. 4 represents a cross section on the line E F, also shown in Fig. 1.

Similar letters refer to similar parts wherever they occur on the different parts of the drawings.

$a$ represents the outer smooth cylinder of a rock-drill, and $b\ b$ represent the clamps that encompass the said cylinder, and are each provided with a pair of ears or projections, $c\ c$, between which the upper ends of the hollow legs $d\ d'\ d'$ are hinged by means of the pins $e\ e'$, provided with nuts $f f'$ on the outside of the ears or projections $c\ c$, as shown. The upper ends of each of the hollow legs $d\ d'\ d'$ is provided with a cog-segment, $g\ g'\ g'$, as shown, that gears into each of the pinions $h\ h'\ h'$, which pinions are loosely adjustable on the pins or bolts $i\ i'$, provided on one end with a head, and on the other end with a fastening-nut, $k\ k'$. One end of each of the pinions $h\ h'\ h'$ is made with a taper, $l\ l'\ l'$, resting in a corresponding taper in the ears or projections $c\ c$, by which the said pinions are firmly secured to the clamp-ears when the nuts $k\ k'$ are screwed up tightly against the outside of the ears $c\ c$.

It will be seen that two objects are accomplished by means of the screw-bolts $i\ i'$, pinions $h\ h'\ h'$, and segments $g\ g'\ g'$, namely—the clamps are secured firmly to the cylinder $a$ at any desired place, at the same time as the legs are secured firmly in any desired position in relation to the clamps $b\ b$ and the cylinder $a$.

On the drawings, one of the clamps is shown in connection with one leg only, as represented on the left-hand side of Fig. 1, and also in Fig. 3; and the other clamp is shown in connection with two legs, as shown on the right-hand side of Fig. 1, and also in Fig. 2. In the former case, only one pinion and one cog-segment are used, whereas in the latter two pinions and two cog-segments are used. This is immaterial, as the one is only a duplicate of the other, and I may, if so desired, employ more than two clamps, each having one or more legs secured thereto, without departing from the spirit of my invention.

Each of the legs is made hollow, as shown, and provided in its lower end with a screw-threaded tapering split end, $m\ m$, around which is screwed a nut, $n$, having a corresponding inner taper, and provided with an annular flange, $n'$, in its upper end, on which the weights $o$ are supported, for the purpose of steadying the drill-cylinder $a$ during the operation of the drill. The split tapering end of the hollow leg is shown in Fig. 4.

The object of the said split tapering end of the hollow leg and its nut is to adjust and secure the central ground point of bar $p$ firmly in position in relation to the hollow leg; and this is accomplished by means of the nut $n$ crowding the tapering split ends of the hollow leg firmly around the central bar $p$ when the said nut is tightened up properly.

Having thus fully described the nature, construction, and operation of my invention, I wish to secure by Letters Patent, and claim—

1. In combination with the plain cylinder $a$, one or more clamps $b\ b$, provided with one or more tapering pinions, $h\ h'\ h'$, tightening-bolts $i\ i'$, and hollow legs $d\ d'\ d'$, with their upper segments $g\ g'\ g'$ and hinge-pins $e\ e'$, as and for the purpose set forth.

2. In combination with the hollow leg $d\ d'\ d'$ and its lower taper, of the flanged nut $n$ and its inner taper, and the central adjustable bar $p$, substantially as and for the purpose set forth.

In testimony that I claim the foregoing as my own invention I have affixed my signature in presence of two witnesses.

JAMES BROWN JOHNSON.

Witnesses:
ALBAN ANDRÉN,
HENRY CHADBOURN.